(12) United States Patent
Patti et al.

(10) Patent No.: US 9,939,854 B2
(45) Date of Patent: Apr. 10, 2018

(54) HANDLING OF A MODULAR INFORMATION HANDLING RESOURCE

(71) Applicant: Dell Products L.P., Round Rock, TX (US)

(72) Inventors: Jeffrey Patti, Georgetown, TX (US); Aaron Donald Vowell, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 605 days.

(21) Appl. No.: 14/299,787

(22) Filed: Jun. 9, 2014

(65) Prior Publication Data
US 2015/0359148 A1  Dec. 10, 2015

(51) Int. Cl.
*B23F 19/00* (2006.01)
*G06F 1/18* (2006.01)

(52) U.S. Cl.
CPC ......... *G06F 1/185* (2013.01); *Y10T 29/49004* (2015.01); *Y10T 29/53257* (2015.01)

(58) Field of Classification Search
CPC ............. H05K 7/1415; H05K 13/0069; H05K 13/0061; H05K 7/12; G06F 1/184; G06F 1/185; Y10T 29/53283; Y10T 29/53257; Y10T 29/49822; Y10T 29/537; Y10T 29/53943; Y10T 403/599

USPC ... 29/758, 259, 278, 426.6, 592.1, 759, 762, 29/764, 829
See application file for complete search history.

(56) References Cited

U.S. PATENT DOCUMENTS

| | | | |
|---|---|---|---|
| 4,858,309 A * | 8/1989 | Korsunsky | H01R 12/7005 29/278 |
| 7,987,584 B2 * | 8/2011 | Barna | H05K 7/1415 29/259 |

* cited by examiner

*Primary Examiner* — Thiem Phan
(74) *Attorney, Agent, or Firm* — Jackson Walker L.L.P.

(57) ABSTRACT

A tool for handling a modular information handling resource may include a drive portion, a first finger mechanically coupled to the drive portion, the first finger configured to apply a first force to a first side edge of the information handling resource when the information handling resource is engaged with the tool, and a second finger mechanically coupled to the drive portion, the second finger configured to apply a second force to a second side edge of the information handling resource opposite from the first side edge when the information handling resource is engaged with the tool. When the information handling resource is coupled to a connector via a bottom edge of the information handling resource adjacent and perpendicular to the side edges, a retention force applied by the connector to the information handling resource overcomes the first and second forces such that the tool releases the information handling resource.

16 Claims, 3 Drawing Sheets

HANDLING OF A MODULAR INFORMATION HANDLING RESOURCE

TECHNICAL FIELD

The present disclosure relates in general to information handling systems, and more particularly to safe handling by a technician or other individual of an information handling resource during installation and de-installation from an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may comprise a variety of different information handling resources for performing the functionality of the information handling system, such as memories, storage resources, networking interfaces, user interface devices, etc. In many instances, some of such information handling resources may be modular, in the sense they may be embodied in pluggable and removable modules which couple to the information handling resource via an appropriate connector. For example, a memory module or other modular information handling resource may comprise a circuit board with an edge connector having a plurality of traces. Such edge connector may be configured to be inserted into a corresponding slot connector coupled to a motherboard or similar information handing resource, such that the slot connector mechanically and electrically couples the memory module or other modular information handling resource to the motherboard.

In many instances, it is desirable that a modular information handling resource be inserted and removed in a particular manner, in order to avoid damage to the modular information handling resource or its corresponding slot connector. For example, to be compliant with the Joint Electron Device Engineering Council (JEDEC) specifications for handling dual-inline memory modules (DIMMs), a person handling a DIMM is to avoid touching the DIMM (except on edges of the module circuit board which do not include an edge connector) and is to insert the DIMM into its corresponding slot connector in a single, parallel stroke, as a "rocking" or non-simultaneous end-to-end installation may result in damage to traces of the edge connector and/or to corresponding electrical contacts of the slot connector. However, the force required to install such a DIMM module may be high enough such that it may cause an individual pain or discomfort to install DIMMs in a JEDEC standard-compliant manner, which may lead such an individual to install a DIMM in a non-compliant manner, leading to risk of damage.

SUMMARY

In accordance with the teachings of the present disclosure, the disadvantages and problems associated with handling of information handling resources may be reduced or eliminated.

In accordance with embodiments of the present disclosure, a tool for handling a modular information handling resource may include a drive portion, a first finger mechanically coupled to the drive portion, wherein the first finger is configured to apply a first force to a first side edge of the information handling resource when the information handling resource is engaged with the tool, and a second finger mechanically coupled to the drive portion, wherein the second finger is configured to apply a second force to a second side edge of the information handling resource opposite from and parallel to the first side edge when the information handling resource is engaged with the tool. The first finger and the second finger may be configured such that, when the information handling resource is coupled to a corresponding connector via a bottom edge of the information handling resource adjacent and perpendicular to the first side edge and the second side edge, a retention force applied by the connector to the information handling resource overcomes the first force and the second force such that the tool releases the information handling resource.

In accordance with these and other embodiments of the present disclosure, a method may include mechanically coupling a first finger to a drive portion, wherein the first finger is configured to apply a first force to a first side edge of an information handling resource when the information handling resource is engaged with the drive portion and mechanically coupling a second finger to the drive portion, wherein the second finger is configured to apply a second force to a second side edge of the information handling resource opposite from and parallel to the first side edge when the information handling resource is engaged with the tool. The first finger and the second finger may be coupled to the drive portion such that, when the information handling resource is coupled to a corresponding connector via a bottom edge of the information handling resource adjacent and perpendicular to the first side edge and the second side edge, a retention force applied by the connector to the information handling resource overcomes the first force and the second force such that the tool releases the information handling resource.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
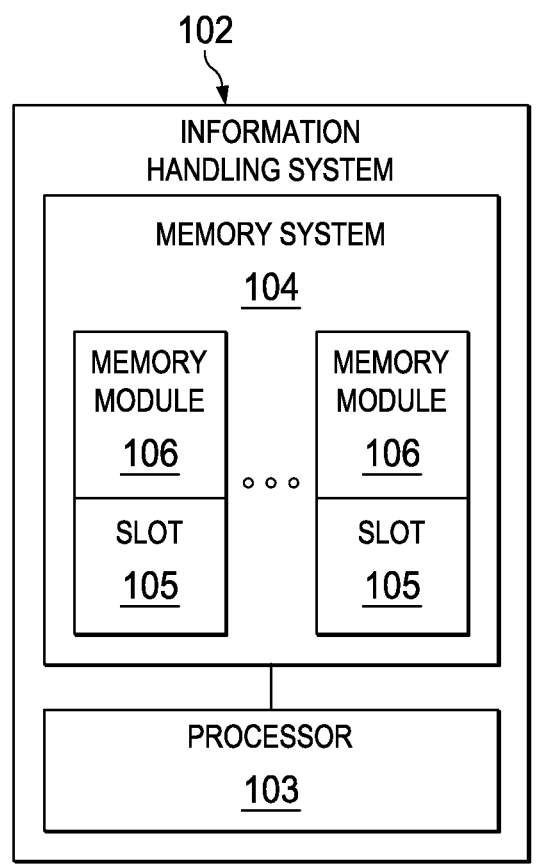
FIG. 1 illustrates a block diagram of an example system, in accordance with embodiments of the present disclosure.
Figure 2A:
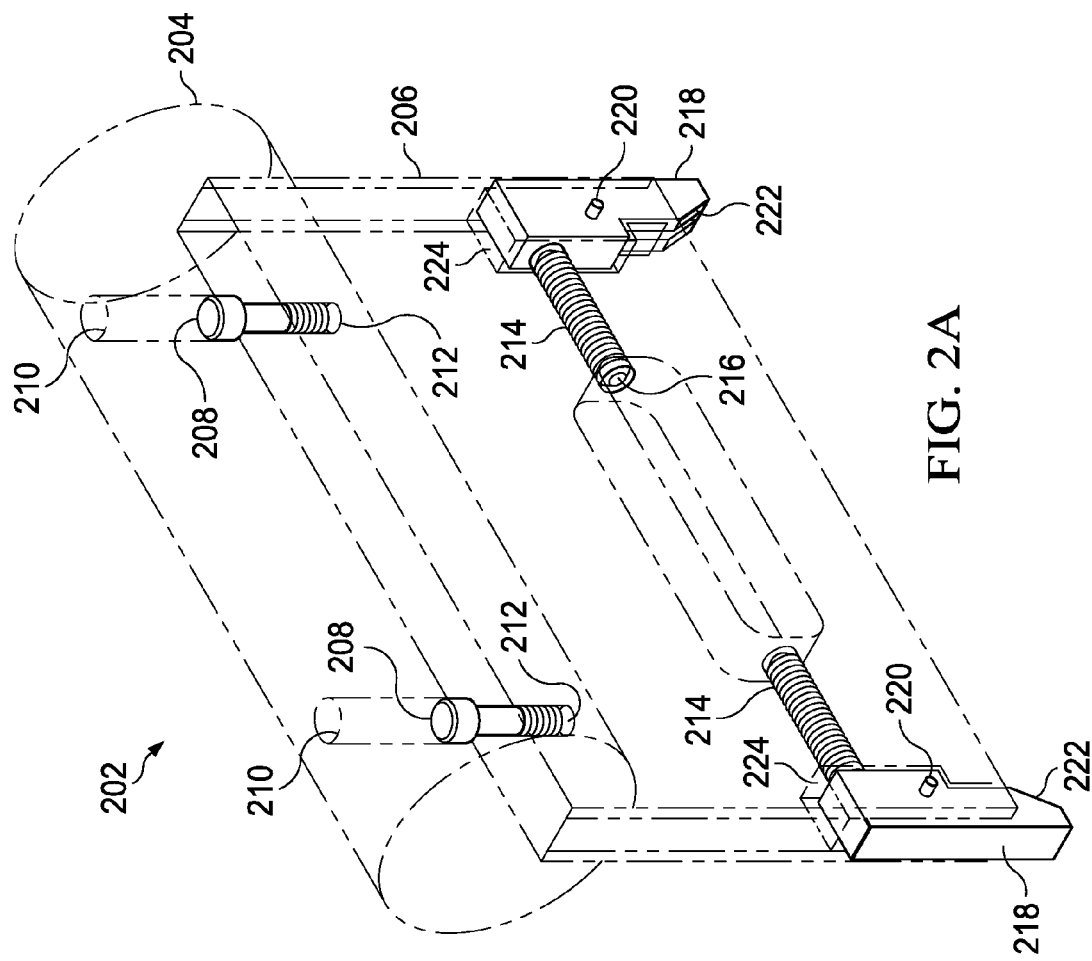
FIGS. 2A and 2B illustrate a tool for handling a modular information handling resource, in accordance with embodiments of the present disclosure.
Figure 2B:
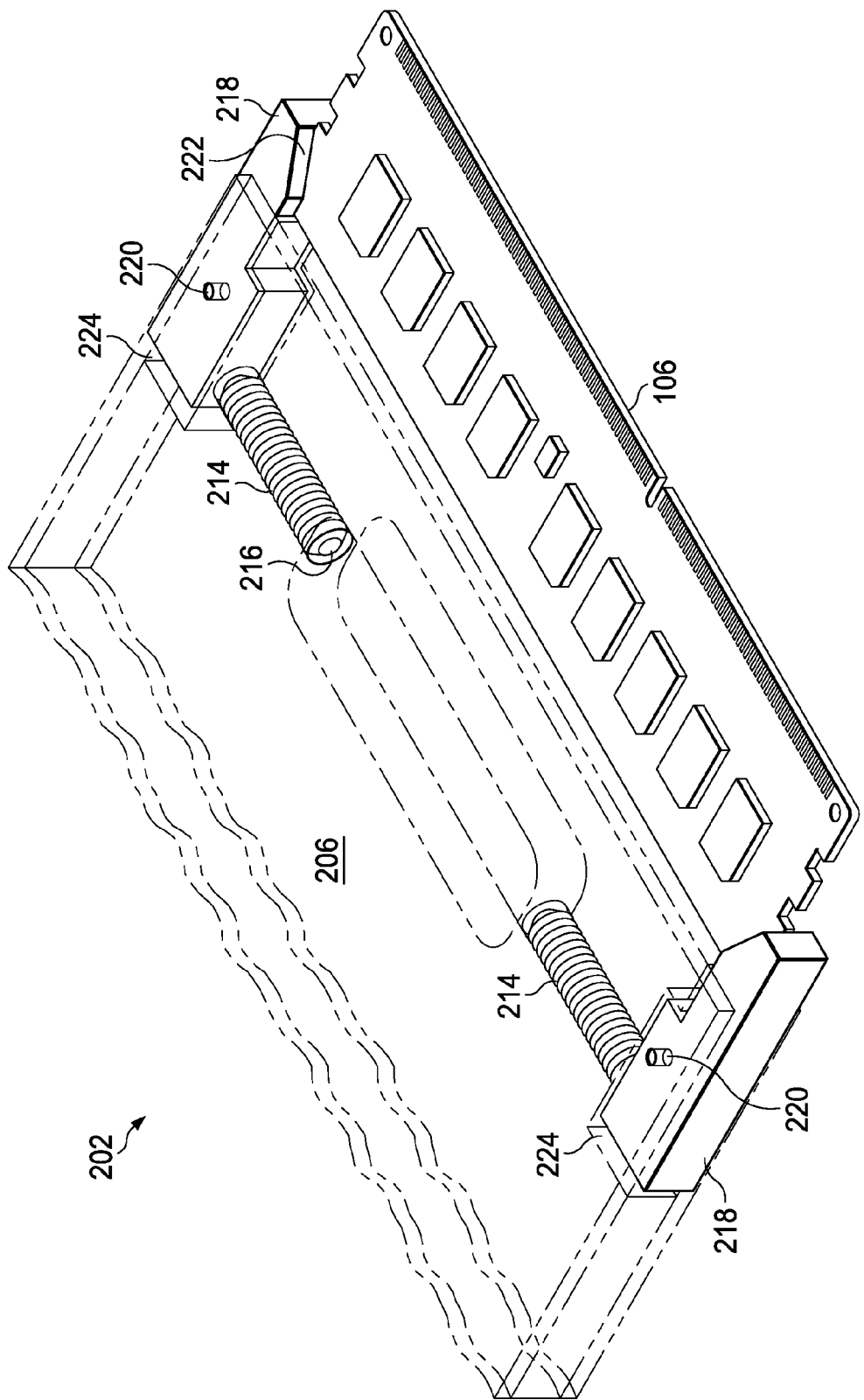

Preferred embodiments and their advantages are best understood by reference to FIGS. 1 through 2B, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of selected components of an example information handling system 102, in accordance with embodiments of the present disclosure. In some embodiments, information handling system 102 may be a personal computer. In some embodiments, information handling system 102 may comprise or be an integral part of a server. In other embodiments, information handling system 102 may be a portable information handling system (e.g., a laptop, notebook, tablet, handheld, smart phone, personal digital assistant, etc.). As depicted in FIG. 1, information handling system 102 may include a processor 103 and a memory system 104 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory system 104 and/or another component of information handling system 102.

Memory system 104 may be communicatively coupled to processor 103 and may include any system, device, or apparatus configured to retain program instructions and/or data for a period of time (e.g., computer-readable media). Memory system 104 may include RAM, EEPROM, a PCM-CIA card, flash memory, magnetic storage, opto-magnetic storage, or any suitable selection and/or array of volatile or non-volatile memory that retains data after power to information handling system 102 is turned off.

As shown in FIG. 1, memory system 104 may comprise a plurality of memory slots 105, each configured to receive a corresponding memory module 106. A memory slot 105 may include any system, device, or apparatus configured to receive a memory module 106 in order to electrically couple such memory module 106 to processor 103. Each memory module 106 may include any system, device or apparatus configured to retain program instructions and/or data for a period of time (e.g., computer-readable media). Each memory module 106 may include a dynamic random access memory (DRAM) module (e.g., a dual in-line package (DIP) memory, a Single In-line Pin Package (SIPP) memory, a Single-Inline Memory Module (SIMM), a Dual-Inline Memory Module, a Ball Grid Array (BGA)), or any other suitable memory.

In addition to processor 103 and memory system 104, information handling system 102 may include one or more other information handling resources.

FIGS. 2A and 2B illustrate a tool 202 for handling a modular information handling resource, in accordance with embodiments of the present disclosure. FIG. 2A depicts an isolated view of tool 202, while FIG. 2B depicts a view of tool 202 engaged with a memory module 106. As shown in FIGS. 2A and 2B, tool 202 may comprise a handle portion 204, a drive portion 206, one or more fasteners 208, and at least two fingers 218.

Handle portion 204 may comprise plastic or other suitable material, and may generally be sized and/or shaped (e.g., in the shape of a circular cylinder as shown in FIGS. 2A and 2B, or any other suitable size and/or shape) to interact with a hand of an individual. As shown in FIGS. 2A and 2B, handle portion 204 may include one or more openings 210, each opening 210 configured to receive a corresponding fastener 208 (e.g., a screw, bolt, etc.) for mechanically coupling handle portion 204 to drive portion 206 (e.g., via openings 212 of drive portion 206). Such coupling of handle portion 204 to drive portion 206 may ergonomically allow a person handling tool 202 to distribute the force applied by the person substantially evenly across the length of an information handling resource being inserted with the assistance of tool 202. Such ergonomic design may reduce operator/technician fatigue, pain, and the possibility of the operator incurring a repetitive stress injury, and comfort of use may encourage a person to continue using tool 202 to insert information handling resources.

Drive portion 206 may comprise plastic or other suitable material, and may be suitably sized and/or shaped to facilitate the functionality of tool 202 (e.g., in the shape of a cube as shown in FIGS. 2A and 2B, or any other suitable size and/or shape). As shown in FIGS. 2A and 2B, drive portion 206 may comprise at least two springs 214, at least two force dials 216, at least two axles 220, at least two recesses 224, and a drive edge 226.

Each spring 214 may comprise a spring plunger or any other system, device, or apparatus for providing a biasing force to a corresponding finger 218 mechanically coupled to such spring 214. For example, in the embodiments represented by FIGS. 2A and 2B, springs 214 may be configured to deliver an expansive force, such that the forces delivered by springs 214 to their corresponding fingers 218 at the points at which they coupled to their corresponding fingers 218 are in substantially opposite directions.

Each spring 214 may have associated therewith a force dial 216. A force dial 216 may comprise any system, device, or apparatus configured to allow an individual to interact therewith in order to adjust a spring force of the spring 214 corresponding to such spring 214. For example, a force dial 216 may be configured such that an individual may, by using a screwdriver, Allen wrench, or other suitable tool, engage with such force dial 216 to adjust a spring force of the corresponding spring 214 (e.g., rotating force dial 216 clockwise to increase the spring force and rotating force dial 216 counterclockwise to decrease the spring force).

Each finger 218 may be rotatably coupled to driver portion 206 via an axle 220 having a rotational axis substantially orthogonal to the direction of forces delivered by springs 214.

At least two recesses 224 may be formed in drive portion 206 and each recess 224 may be sized and shaped to house or otherwise accommodate a corresponding finger 218, including its rotational translation about its corresponding axis 220.

Each finger 218 may comprise plastic, metal, or other suitable material. As shown in FIGS. 2A and 2B, a finger may include a feature 222. Such feature 222 may be configured such that, when a force is applied to such feature 222 (e.g., by a circuit board comprising an information handling resource) such force may cause rotation of finger 218 in an angular direction opposite to the force delivered by a corresponding spring 214 should the force to feature 222 overcome the force of the corresponding spring 214.

In operation, an individual using tool 202 may cause tool 202 to handle a circuit board embodying a memory module 106 or another information handling resource by engaging tool 202 with the circuit board such that edge 226 of drive portion 206 engages with a top edge of the circuit board (e.g., an edge of the circuit board having no edge connectors) and fingers 218 engage with side edges of the circuit board adjacent and perpendicular to the top edge, such that each finger 218 provides a force to the side edge to which it is engaged, holding the circuit board in place via friction between fingers 218 and the side edges. During the process of such engagement, the top edge and/or the corners of the circuit board between the top edge and the side edges may interact with feature 222, thus compressing springs 214 and allowing rotation of fingers 218 such that fingers 218 may grasp the side edges.

To install the circuit board into an information handling system or another information handling resource, an individual may then handle tool 202, with the circuit board engaged thereto, in a manner so as to mate a bottom edge opposite the top edge of the circuit board to a corresponding slot connector. If the friction force or other retention force between the slot connector and the bottom edge is greater than the force engaging the circuit board to tool 202, tool 202 may then release the circuit board, leaving the circuit board installed in the slot connector.

Although the present disclosure has been described in detail, it should be understood that various changes, substitutions, and alterations can be made hereto without departing from the spirit and the scope of the disclosure as defined by the appended claims.

What is claimed is:

1. A tool for handling a modular information handling resource comprising:
   a drive portion for inserting the information handling resource into a connector, the drive portion including a first spring;
   a first finger mechanically coupled to the drive portion, wherein the first finger is configured to apply an inwardly directed first force to a first side edge of the information handling resource when the information handling resource is engaged with the tool, wherein the first spring is configured to mechanically couple the first finger to the drive portion, and further configured to deliver a first spring force to the first finger causing the first force to be applied to the first side edge; and
   a second finger mechanically coupled to the drive portion, wherein the second finger is configured to apply an inwardly directed second force to a second side edge of the information handling resource opposite from and parallel to the first side edge when the information handling resource is engaged with the tool;
   wherein the first finger and the second finger are configured such that, when the information handling resource is coupled to the connector via a bottom edge of the information handling resource adjacent and perpendicular to the first side edge and the second side edge, a retention force applied by the connector to the information handling resource is configured to overcome the first force and the second force such that the tool is configured to release the information handling resource.

2. The tool of claim 1, wherein the information handling resource is a circuit board.

3. The tool of claim 1, wherein the drive portion further comprises a second spring configured to:
   mechanically couple the second finger to the drive portion; and
   deliver a second spring force to the second finger causing the second force to be applied to the second side edge.

4. The tool of claim 3, wherein the drive portion further comprises:
   a first pivot rotatably coupling the first finger to the drive portion, the first pivot having an axis substantially perpendicular to the direction of the first force; and
   a second pivot rotatably coupling the second finger to the drive portion, the second pivot having an axis substantially perpendicular to the direction of the second force.

5. The tool of claim 1, wherein the drive portion further comprises a first pivot rotatably coupling the first finger to the drive portion, the first pivot having an axis substantially perpendicular to the direction of the first force.

6. The tool of claim 5, wherein the first finger comprises a feature configured such that, when an external force is applied to such feature, such external force is configured to cause rotation of the first finger in an angular direction opposite to the first spring force delivered by the first spring if the external force to the feature overcomes the first spring force.

7. The tool of claim 1, wherein the first spring force is adjustable.

8. The tool of claim 1, further comprising a handle portion mechanically coupled to the drive portion for interacting with a hand of a person, such that an insertion force applied to the handle portion by the person is distributed substantially evenly across the length of an information handling resource to which the tool is coupled.

9. A method comprising:
mechanically coupling a first finger of a tool to a drive portion of the tool, wherein the first finger is configured to apply an inwardly directed first force to a first side edge of an information handling resource when the information handling resource is engaged with the tool, and wherein the drive portion is configured for inserting the information handling resource into a connector;
mechanically coupling the first finger to the drive portion via a first spring such that the first spring is configured to deliver a first spring force to the first finger causing the first force to be applied to the first side edge; and
mechanically coupling a second finger of the tool to the drive portion, wherein the second finger is configured to apply an inwardly directed second force to a second side edge of the information handling resource opposite from and parallel to the first side edge when the information handling resource is engaged with the tool;
wherein the first finger and the second finger are coupled to the drive portion such that, when the information handling resource is coupled to the connector via a bottom edge of the information handling resource adjacent and perpendicular to the first side edge and the second side edge, a retention force applied by the connector to the information handling resource is configured to overcome the first force and the second force such that the tool is configured to release the information handling resource.

10. The method of claim 9, wherein the information handling resource is a circuit board.

11. The method of claim 9, further comprising mechanically coupling the second finger to the drive portion via a second spring such that the second spring is configured to deliver a second spring force to the second finger causing the second force to be applied to the second side edge.

12. The method of claim 11, further comprising:
rotatably coupling the first finger to the drive portion via a first pivot, the first pivot having an axis substantially perpendicular to the direction of the first force; and
rotatably coupling the second finger to the drive portion via a second pivot, the second pivot having an axis substantially perpendicular to the direction of the second force.

13. The method of claim 9, further comprising rotatably coupling the first finger to the drive portion via a first pivot, the first pivot having an axis substantially perpendicular to the direction of the first force.

14. The method of claim 13, wherein the first finger comprises a feature configured such that, when an external force is applied to such feature, such external force is configured to cause rotation of the first finger in an angular direction opposite to the first spring force delivered by the first spring if the external force to the feature overcomes the first spring force.

15. The method of claim 9, further comprising coupling a force dial to the first spring such that the first spring force is adjustable via the force dial.

16. The method of claim 9, further comprising mechanically coupling a handle portion to the drive portion for interacting with a hand of a person, such that an insertion force applied to the handle portion by the person is distributed substantially evenly across the length of an information handling resource to which the tool is coupled.

\* \* \* \* \*